(12) United States Patent
Sahramaa

(10) Patent No.: US 7,891,072 B2
(45) Date of Patent: Feb. 22, 2011

(54) JOINING FRAME COMPONENTS WITH A Z CONNECTION

(76) Inventor: Kimmo J Sahramaa, 11301 S. Shore Rd., Reston, VA (US) 20190

( * ) Notice: Subject to any disclaimer, the term of this patent is extended or adjusted under 35 U.S.C. 154(b) by 1144 days.

(21) Appl. No.: 11/200,463

(22) Filed: Aug. 10, 2005

(65) Prior Publication Data

US 2007/0036610 A1    Feb. 15, 2007

(51) Int. Cl.
*B21D 39/00*    (2006.01)
*F16D 1/072*    (2006.01)

(52) U.S. Cl. .......................... 29/521; 403/282

(58) Field of Classification Search .............. 29/509, 29/514, 521; 403/282
See application file for complete search history.

(56) References Cited

U.S. PATENT DOCUMENTS

| | | |
|---|---|---|
| 1,574,304 A | 2/1926 | Pawling |
| 2,067,945 A | 1/1937 | Peters |
| 2,874,980 A | 2/1959 | Browning |
| 3,082,850 A * | 3/1963 | Weening ............. 52/127.5 |
| 3,878,598 A * | 4/1975 | Steward ............. 29/432.2 |
| 5,051,020 A | 9/1991 | Schleicher |

\* cited by examiner

*Primary Examiner*—John C Hong

(57) ABSTRACT

A web truss and a chord truss are joined or connected to each other. Each truss has an extruded hole with flanges, collars and combinations of flanges and collars. When a tool placed against the flanges they are expanded to form Z configurations. When the tool is placed against a collar the collar folds over another member's bottom portion or, depending on the configuration, another member's collar. These configurations and the folding of collars act to inhibit separation of the trusses from each other. The method and assembly are ideally suited for automated processes in a Just In Time fashion.

4 Claims, 3 Drawing Sheets

JOINING FRAME COMPONENTS WITH A Z CONNECTION

BACKGROUND OF THE INVENTION

1. Field of the Invention

This invention relates to the field of joining light gauge frame members for floors, ceilings, walls and roofs and has particular utility in fabricating trusses and wall, floor and roof frames for commercial structures, industrial metal buildings, residential and multistory buildings.

2. Background of the Invention

In U.S. Pat. No. 5,839,848. titled Joining Metal Members and issued to the present inventor, depending collars and through holes are used. The collars are crimped and bent to join the metal members. The technique taught in U.S. Pat. No. 5,839,848 works well as the uses it is put to. However where the members are joined only one of the holes is extruded while the other is not and is merely a hole.

It is an object of the invention to provide for a stronger connection of frame members with the use of extruded holes. In light gauge steel the goal in loading the sheet metal is to engage as much material as possible. To this end the present invention does not have merely a hole in the weaker member but both members have extrusions to make the area of engagement stronger whereby the amount of engaging material is greater.

It is further object of the invention to provide for a better engagement of one metal member to another.

It is another object of this invention to improve on U.S. Pat. No. 5,839,848 to provide for a greater area of engagement in connected frame members.

It is another object of this invention to provide for frame members that can be joined quickly and accurately in a Just In Time fashion.

SUMMARY OF THE INVENTION

Two metal members to be joined each have an extruded circular hole with an annular flange. One member is placed to nest within another member. A tool is placed in an extruded hole to expand the flanges to thereby cause the flanges to be bent into a Z configuration.

To further strengthen the joint one of the members has a cup with a collar while the other member has only a bottom lip. The member with the lip is nested within the collared cup and again a tool expands the diameters of the holes and bends the collar around the bottom lip of the other member. The resulting Z configuration affords great strength to the connection of joined members while the collar of one member is folded around the bottom lip of the other member.

Both of the metal members can have extruded holes and cups. The cup of one member is placed to nest within the cup of the other member. A tool enlarges the extruded holes with the result that a Z configuration is formed while the collar of one member is folded around the other collar.

DETAILED DESCRIPTION OF THE INVENTION

The drawings are not drawn to scale. Where the terms web and chord are used no limitation is intended. The terms can be interchanged with no change in function or result. The members and trusses are shown separated to a great degree in order to illustrate tolerances but no intention is made to show their actual sizes relative to one another.

Figure 1:
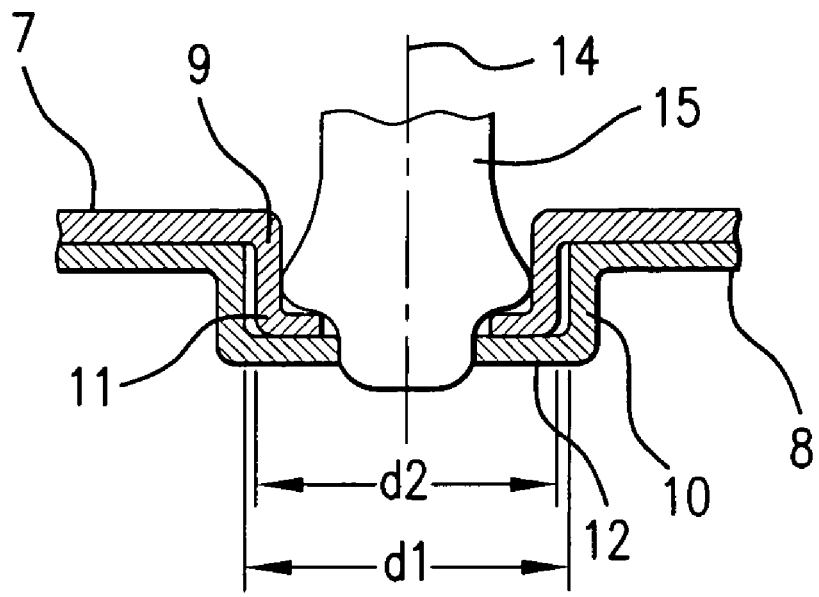
FIG. 1 is a cross section of a first embodiment of the invention showing two metal members before being joined and shows extruded holes and L shaped portion in both members.

FIG. 1 shows a first embodiment of the invention and is the basis of the invention in that separation of joined members is restrained using L shaped connector details. In this embodiment each member has an extruded, substantially annular hole and an annular flange and bottom in both members. Together as seen in cross section the flange and bottom form an L shape. FIG. 1 shows two members 7 and 8 before they are connected or joined.

The member 7 is formed from a strip of light gauge rolled steel and a hole is extruded and a portion is deformed out of the plane of the sheet into an L shape of annular form. Sheet metal of the type used herein is capable of being deformed. To this end an annular flange 9 depends downwardly and joins lip 11 which is generally parallel to the surfaces of member 7. Together the flange 9 and lip 11 initially form an L shape.

A similar method is used to process sheet metal strip 8. In analogous fashion an annular flange 10 depends downwardly and joins lip 12 which is generally parallel to the surfaces of the member 8 forming an L shape.

The annular flanges 9 and 10 as seen in FIG. 1 are arranged at a first orientation. The edges of the flanges 9 and 10 where they join the surfaces of members 7 and 8 and the lips 11 and 12 are slightly rounded as shown. The first orientation is shown in an upstanding position but is preferably at a slight angle. The outside diameter of the annular flange 9 in member 7 is designated d2 and the inside diameter of the annular flange 10 in member 8 is designated d1; the diameters aligned along a concentric axis 14. It is desirable to have tolerances in formed connector details to ease the assembly and, for example, permit easier nesting of the members. In FIG. 1 the diameter d2 is less than diameter d1 so as to permit nesting of the L shape of member 7 into the L shape member 8 as described hereinafter.

One of the advantages of the present invention is that all the operations can be done in a Just In Time fashion at single location or factory under the automated control of a computer driven assembly system. Automated means, not shown, determine with precision and accuracy where the extruded holes are to be positioned along the sheet metal strip. The holes are then extruded and the flanges formed.

One L shaped member is nested within the other. In a snap joining operation the L shape formed by flange 9 and lip 11 is nested within the L shape formed by flange 10 and lip 12.

Figure 2:
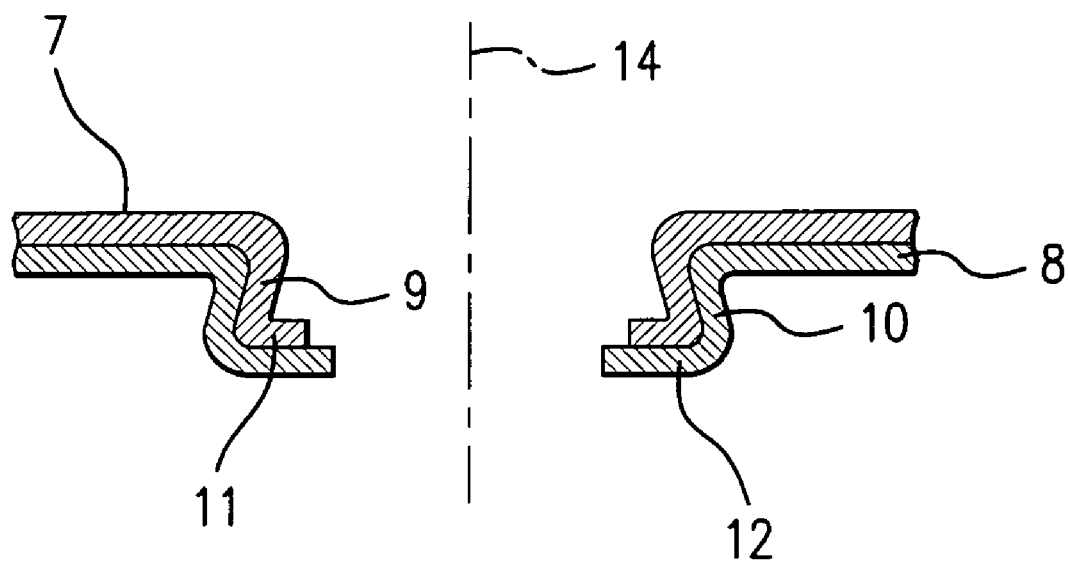
FIG. 2 shows the result of joining the members of FIG. 3.

FIG. 2 shows the result of joining the members of. FIG. 1. After the nesting operation a tool, shown generally at 15 in FIG. 1, expands the extruded holes forcing the flanges 9 and 10 outwardly, away from the first orientation, a general L shape configuration, to a second inclined orientation, a Z configuration. As both flanges 9 and 10 are inclined this is considered a double zee or double Z configuration.

In FIGS. 1 and 2 the first member can be a web of a truss and the second member can be a chord of a truss although the members could be respectively reversed without any change in function or they could be members of any frame or frame panel. In wall panels connected members are often called track and stud, in roof panels joist and rim joist, in roofs rafter and rim.

Figure 3:
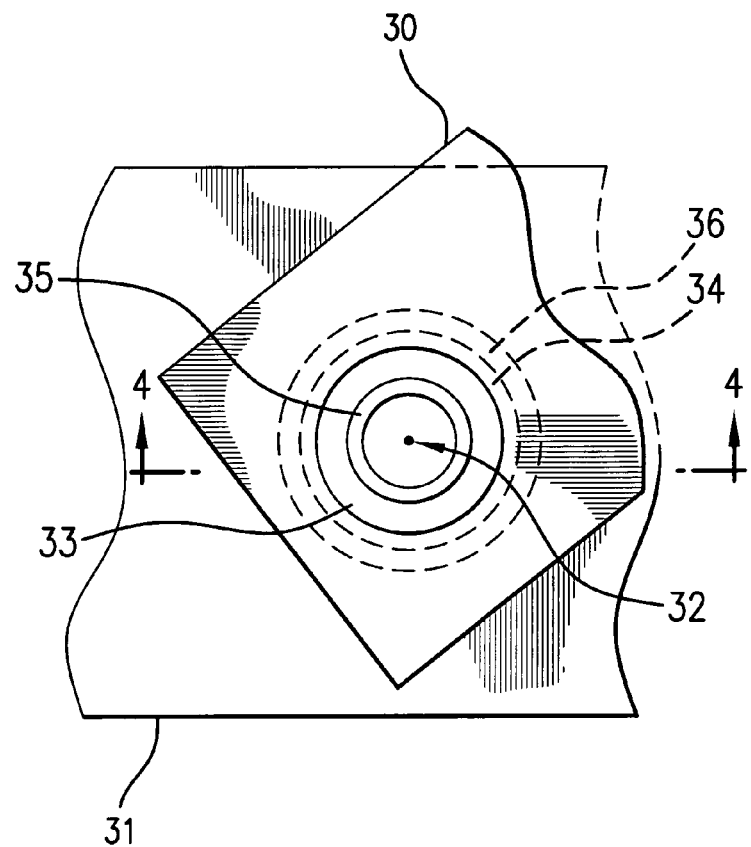
FIG. 3 is a top view of two metal members prior to their being joined to each other using a single L shape in one member and a single cup in the other member.

FIG. 3 is a top view of two metal members prior to their being joined to each other. One member has a single L shaped connector detail and the other member has a single cup shaped connector detail. The members are made from a roll of sheet metal strip. A typical application of the invention is shown as applied to web and chord trusses. The members to be joined are trusses, frames or frame components of light gauge metal from 22 to 14 gauge galvanized metal, but can be lighter or heavier gauge or other metals, such as stainless steel. Numeral 32 designates the centerline of two extruded and substantially circular holes.

Figure 4:
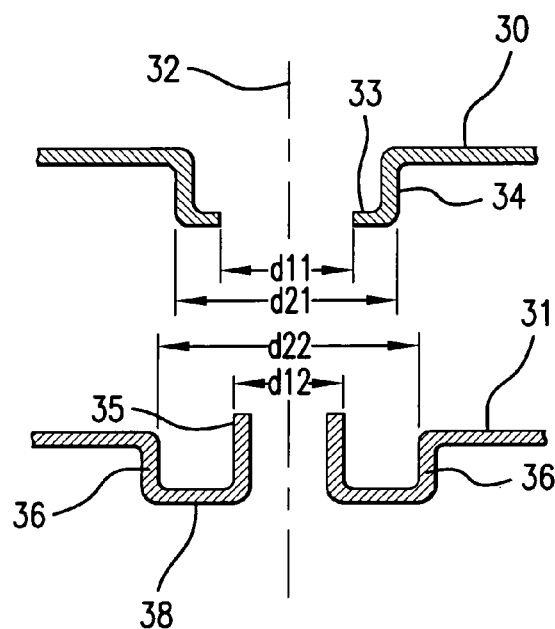
FIG. 4 is a cross sectional view along line 4-4 of FIG. 3.

FIG. 4 is a cross sectional view along lines 4-4 of FIG. 3. The method of joining members in FIGS. 3 and 4 utilizes the teachings the L shape of FIGS. 1 and 2 for one of the metal members. For clarity the tool is not shown to avoid obscuring the drawings.

Referring to both FIGS. 3 and 4 the upper surface of web truss 30 has an annular flange 34 which depends downwardly and joins annular bottom, or lip, 33 which is generally parallel to the surfaces of the steel strip 30. As shown, the flange 34 and lip 33 are in L shape. The outer extremities of lip 33 defines a first diameter d11.

Chord truss 31 has a cup formed therein. The steel strip is deformed into a cup defined by an annular flange 36 depending downwardly from the top surface of chord 31, an annular bottom 38 which is generally parallel to the surfaces of the steel strip and an annular collar 35. The collar extends upwardly from the bottom 38 and inclines slightly towards the centerline 32. The depth of the cup is sufficient to accept the lip 33 nesting within the cup or resting on the top surface of bottom portion 38. The inside diameter of collar 35 defines a second diameter d12 of chord truss 31 which is less than the first diameter d11 and sharing the same centerline 32. Flange 34 has an outside diameter d21 while d22 represents the inside diameter of flange 36 with d21 less than d22. The relative sizes for the diameters, as shown and described, provide acceptable tolerances so that the member 30 can nest within the cup of member 31 as shown in FIG. 4.

In operation the lip 33 is inserted into the cup formed by portions 36, 38 and collar 35 in a snap joining operation to nest the bottom 33 of web 30 within the cup of chord 31.

Figure 5:
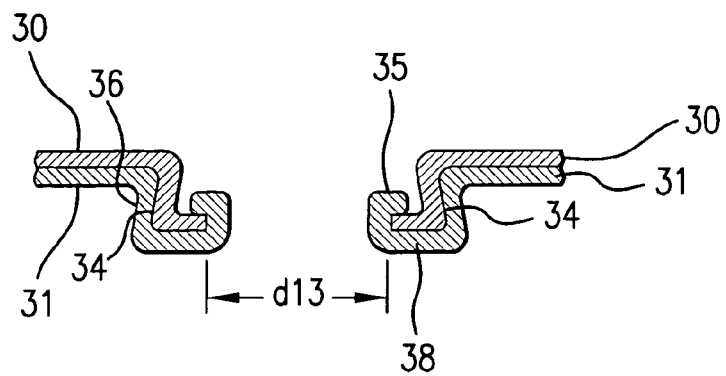
FIG. 5 shows the result of joining the members of FIG. 5.

Referring to FIG. 5 a tool, not shown, is placed within the extruded holes and the tool is expanded outwardly against the collar 35. This causes the collar 35, bottoms 33, 38 and flanges 34, 36 to move in an outward direction away from the centerline 32. Further operation of the tool then causes the collar 35 to be folded over the lip 33.

As a consequence the expansion of the tool causes the extruded holes to increase slightly in diameter and the flanges 34 and 36 are caused to be inclined forming a Z configuration. The result is a strengthened connection of the web and chord trusses which finds particular utility when joining larger gauge trusses such 14 gauge metal. The diameter of annular collar 35 has increased from d12 to d13.

Two factors act together to strengthen the connection. First, the inclination will resist any tendency for the members to separate from each other as earlier described. A second factor strengthening the connection is the overlapping configuration. As the collar 35 folds over the lip 33 the resulting overlap also resists any tendency of the web truss to separate from the chord truss.

Figure 6:
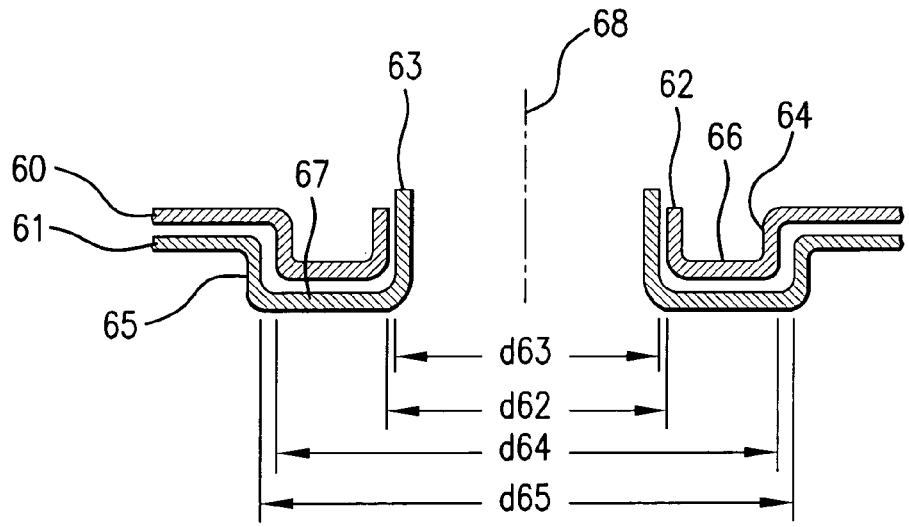
FIG. 6 is a cross sectional view showing a modification of two metal members prior to their being joined to each other using a cup formed in each member.

FIG. 6 shows a modification where the metal members have a cup formed in each member prior to their being joined. Member 60 has a substantially annular cup formed of annular collar 62, flange 64 and bottom portion 66. In an analogous fashion member 61 has a substantially annular cup formed of annular collar 63, flange 65 and bottom portion 67. Each of the collars 62, 63 have, before being joined or connected, a first orientation extending generally upwardly and slightly towards the centerline of the concentric axis 68 of the extruded holes. The collar 63 has an outside diameter d63, collar 62 has an inside diameter d62, and flange 64 has an outside diameter d64 and flange 65 has an inside diameter d65. The diameters are such that d63 is smaller than d62, and d64 is smaller than d65, as shown, so as to permit nesting of the cup of member 60 within the cup of member 61.

Figure 7:
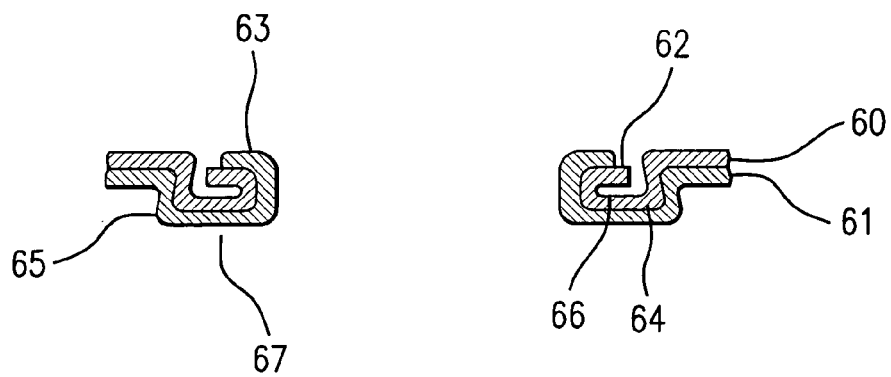
FIG. 7 shows the result of joining the members of FIG. 6.

FIG. 7 shows the result of joining the members of FIG. 6 wherein like reference numerals are used. After the cups are nested, or placed, in relationship as shown in FIG. 6 by snap joining them, a tool, not shown, expands the collars outwardly thus increasing the aforementioned diameters. The collars 62, 63 and flanges 64, 65 are inclined slightly to a second orientation. Further operation of the tool causes the collar 63 to be folded over the collar 62. This is analogous to the situation depicted in FIG. 5 where the increased diameter and overlapping materials act to inhibit separation of one member from the other.

The invention finds particular utility in high volume production of trusses. No large inventories are needed as a computer controls the location of the extruded holes, bottom lips and cups; the trusses are precisely positioned and a tool joins the members together.

With no intent to limit the invention the following exemplary measurements are given. The degree of inclination may be up to 8 degrees. With 14 gauge trusses an original inside hole diameter may be increased from 20 mm to 21.5, an increase of 7.5%. The trusses may be other than 14 gauge but this gauge is being widely employed today in the building trades industry.

The invention finds particular utility with light gauge metals ranging in thickness from 33 to 80 mils, or 0.75 to 2.0 mm. Webs and chords of various configurations can be used. A significant advantage of the invention is that the collars can be directed in either direction from from the surface of the truss depending on the desired use. Each of the members can have as many extrusions, bottom lips and collars as dictated by the truss or frame design considerations.

The invention claimed is:

1. An assembly of joined metal members comprising:
a first metal member having a first substantially circular extruded hole;
said first metal member having a first annular flange and a first lip;
a second metal member with a second substantially circular extruded hole;
said second metal member having a second annular flange and a second lip;
said first metal member nested within second metal member; and
said first annular flange and second annular flange are inclined to inhibit separation of said first metal member from said second metal member.

2. The assembly of claim 1, wherein said first annular flange and second annular flange are inclined in a Z configuration.

3. An assembly of joined metal members comprising:
a first metal member with a first substantially circular extruded hole;

said first metal member having a first annular flange and a lip;

a second metal member with a second substantially circular extruded hole;

said second metal member having a substantially annular cup defined by a second annular flange, a bottom and a collar;

said first metal member nested within second metal member;

said first annular flange and second annular flange are inclined; and said collar is folded over said lip;

whereby said first metal member is joined to said second metal member to inhibit separation of said first metal member from said second metal member.

4. The assembly of claim 3, wherein said first and second annular flanges are inclined in a Z configuration.

* * * * *